United States Patent
Riendeau et al.

(10) Patent No.: US 11,762,667 B2
(45) Date of Patent: Sep. 19, 2023

(54) ADJUSTING SYSTEM SETTINGS BASED ON DISPLAYED CONTENT

(71) Applicant: International Business Machines Corporation, Armonk, NY (US)

(72) Inventors: John A Riendeau, Madison, WI (US); Charles E. Beller, Baltimore, MD (US); Edward Graham Katz, Washington, DC (US); Sean Thomas Thatcher, Stone Ridge, VA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 17/130,275

(22) Filed: Dec. 22, 2020

(65) Prior Publication Data

US 2022/0197672 A1   Jun. 23, 2022

(51) Int. Cl.
| | |
|---|---|
| *G06F 1/24* | (2006.01) |
| *G06F 9/445* | (2018.01) |
| *G06F 21/45* | (2013.01) |
| *G06N 20/00* | (2019.01) |
| *G06V 10/40* | (2022.01) |
| *G06F 18/2431* | (2023.01) |
| *G06F 9/4401* | (2018.01) |

(52) U.S. Cl.
CPC ...... *G06F 9/44505* (2013.01); *G06F 18/2431* (2023.01); *G06F 21/45* (2013.01); *G06N 20/00* (2019.01); *G06V 10/40* (2022.01); *G06F 9/4411* (2013.01)

(58) Field of Classification Search
CPC .. G06F 9/44505; G06F 18/2431; G06F 21/45; G06F 21/32; G06F 21/31; G06N 20/00; G06V 10/40; G06V 40/172

USPC .......................................................... 713/100
See application file for complete search history.

(56) References Cited

U.S. PATENT DOCUMENTS

| | | | |
|---|---|---|---|
| 8,856,831 B2 * | 10/2014 | Ahn | H04N 21/42653 725/43 |
| 10,025,676 B2 | 7/2018 | Kashyap | |
| 10,200,824 B2 | 2/2019 | Gross | |
| 2008/0226174 A1 * | 9/2008 | Hua | G06F 18/2137 382/190 |
| 2013/0163860 A1 * | 6/2013 | Suzuki | G06V 30/224 382/159 |
| 2013/0183022 A1 * | 7/2013 | Suzuki | G06F 16/739 386/241 |

(Continued)

OTHER PUBLICATIONS

Anonymous. "Content-based chat history tree." Published Jun. 9, 2015. 7 pages. Published by ip.com. https://priorart.ip.com/IPCOM/000241921.

(Continued)

*Primary Examiner* — Volvick Derose
(74) *Attorney, Agent, or Firm* — David K. Mattheis

(57) ABSTRACT

A method for adjusting device system settings in response to analysis of displayed content. In some embodiments, a processor may extract content from contents displayed on a screen of a device. The processor may analyze features of the content. The processor may classify the content as belonging to a content class, based on analysis of the content features, utilizing a machine learning model. The processor may update the device system settings based on the content class.

14 Claims, 5 Drawing Sheets

(56) References Cited

U.S. PATENT DOCUMENTS

| | | | | |
|---|---|---|---|---|
| 2015/0193698 | A1* | 7/2015 | Nakamura | G06N 20/00 |
| | | | | 706/12 |
| 2016/0360382 | A1* | 12/2016 | Gross | G06F 9/453 |
| 2019/0122082 | A1* | 4/2019 | Cuban | G06T 7/73 |
| 2019/0250891 | A1* | 8/2019 | Kumar | G06F 18/2411 |
| 2021/0195286 | A1* | 6/2021 | Lohumi | H04N 21/812 |

OTHER PUBLICATIONS

Anonymous. "System and Method for Rendering Documentation Content to Annotate Derived User Interest Areas." Published Jun. 14, 2018. 6 pages. Published by ip.com. https://priorart.ip.com/IPCOM/000254252.

Anonymous. "Technology User Guide, vol. I: Introduction to Online Testing." Published Nov. 7, 2018. 54 pages. Published by DRC Insight.

Anonymous. "Use Smart Lock on your Galaxy phone." Accessed Jun. 24, 2020. 3 pages. Published by Samsung. https://www.samsung.com/us/support/answer/ANS00062631/.

Anonymous. "Using device usage patterns and behaviours to create personalised content." Published Apr. 15, 2016. 4 pages. Published by ip.com. https://priorart.ip.com/IPCOM/000245881.

Botzer, A., et al., "User Settings of Cue Thresholds for Binary Categorization Decisions." 15 pages. Journal of Experimental Psychology: Applied 16 (2010), 1, pp. 1-15. Published by American Psychological Association. https://dx.doi.org/10.1037/a0018758.

Mell, et al., "The NIST Definition of Cloud Computing," Recommendations of the National Institute of Standards and Technology, U.S. Department of Commerce, Special Publication 800-145, Sep. 2011, 7 pgs.

Data Recognition Corporation, DRC Insight Online Learning System, Accessed on Mar. 31, 2023, 3 Pgs, <https://www.datarecognitioncorp.com/education-serivces/insight/>.

\* cited by examiner

ADJUSTING SYSTEM SETTINGS BASED ON DISPLAYED CONTENT

BACKGROUND

The present disclosure relates generally to the field of automatic configuration of device settings, and more specifically to adjusting device system setting in response to analysis of displayed content.

Computing devices have system settings that control how content is displayed on a device screen. Some system settings control when a device screen changes from an active screen on which content is displayed and applications can be accessed to an inactive screen where not all content or applications are visible or accessible. The device screen can switch from an active screen to an inactive screen based on system settings that are focused on device security, reduction of energy consumption, or reduction in inadvertent use of the device. The device screen can revert back to an active screen based on a user's successful unlock attempt, such as by entering a passcode, providing a fingerprint, or by facial recognition.

SUMMARY

Embodiments of the present disclosure include a method, computer program product, and system for adjusting device system settings in response to analysis of displayed content.

In some embodiments, a processor may extract content from contents displayed on a screen of a device. The processor may analyze features of the content. The processor may classify the content as belonging to a content class, based on analysis of the content features, utilizing a machine learning model. The processor may update the device system settings based on the content class.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
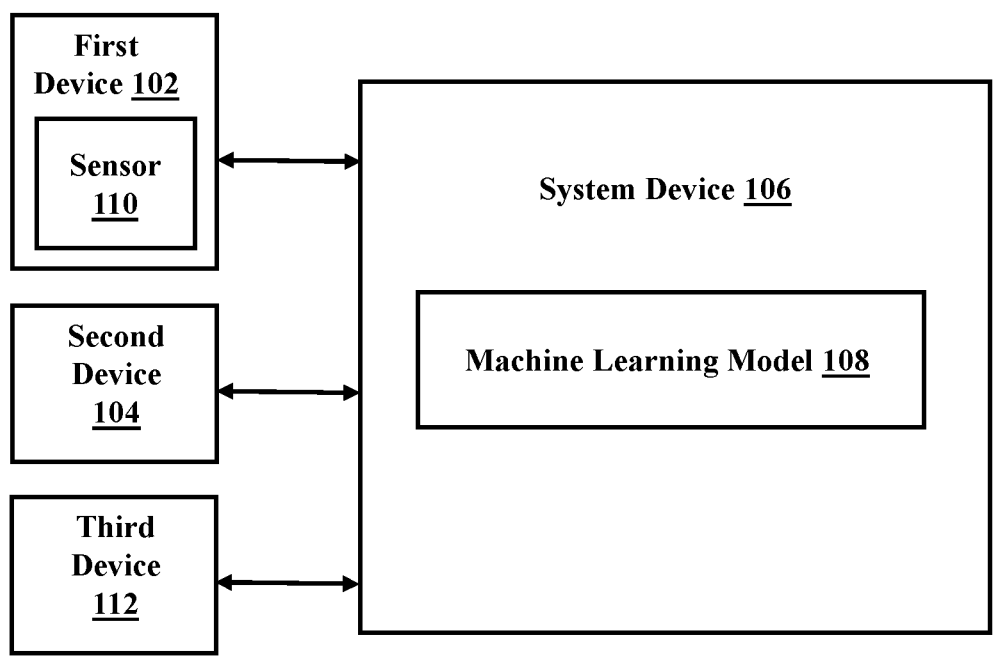
FIG. 1 is a block diagram of an exemplary system for adjusting device system settings in response to analysis of displayed content, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to automatic configuration of device settings, and more specifically to adjusting device system settings in response to analysis of displayed content. While the present disclosure is not necessarily limited to such applications, various aspects of the disclosure may be appreciated through a discussion of various examples using this context.

In some embodiments, content may be extracted from contents displayed on a screen of a device. In some embodiments, the device may be any computing device such as a computer, mobile phone, tablet, augmented reality device, smartwatch, etc. In some embodiments, the extracted content may be content that is displayed on the screen of the device and provides an indication of what the device is being utilized by a user to do. In some embodiments, the extracted content may be textual content (e.g., numbers, words, sentences, or phrases displayed on the screen), formatting content (e.g., indentations of text indicating a title, a section heading, or an element on list; use of non-textual marks such as bullet points; etc.), or visual or auditory content (e.g., audio or visual data from video clips or audio clips), etc.

As an example, a user may use a smartphone to reference a recipe for chicken soup while the user is cooking chicken soup. The recipe may include a list of ingredients, cooking time, and instructions on how to cook the chicken soup in ten steps. The extracted content may include textual content such as the title of the page "Chicken Soup Recipe," the word "ingredients" used to identify the ingredients needed to prepare the recipe, and use of words such as "first," "chop," "second," "sauté," "third," and "add" in the step-by-step instructions for preparing the recipe. Formatting content may include the centering of the title in the middle of the page, a listing of the items under an "ingredients" heading with one or two words per line, and providing the step-by-step instructions in one or two sentences after a numbered bullet point.

In some embodiments, the extracted content may include the content (e.g., text and its formatting) that is visible on the device screen. In some embodiments, the extracted content may include content from a media (e.g., a webpage or page of another application such as a PDF or book reading application) that is open/playing/displayed on the device. The media may include content that is visible on the device screen and content that is not visible on the device screen but is part of the media.

For example, a smartphone screen may display a cooking recipe obtained through a web browsing application. The web browsing application may be open to a page or tab showing the recipe. The device screen may only display the first three steps of the recipe, but there may be ten steps in the recipe provided on the page of the web browsing application. In some embodiments, the content that is extracted is the content visible on the device screen (e.g., the first three steps). In some embodiments, both the visible (e.g., the first three steps) and the non-visible content (e.g., the remaining seven steps) may be extracted. In some embodiments, the content (e.g., text, formatting, audio/visual content) that is visible on the device screen may be identified, labeled, and distinguished from the content that is not visible on the device screen. In some embodiments, the features from the visible content may be given different weight when analyzed compared to the features from the non-visible content.

In some embodiments, features of the content may be analyzed. In some embodiments, features of the visual content may be analyzed using image analysis techniques. In some embodiments, features of the audio content may be analyzed using audio analysis techniques, such as audio to text conversion. In some embodiments, features of textual content may be analyzed using natural language processing techniques.

For example, features of textual content may be analyzed to identify n-gram features capturing special vocabulary (e.g., recipe, ingredients, boil, sauté, chop, etc.), syntax features (e.g., the syntax of step by step instructions "first, chop the vegetables," which is distinctive from other sentences or sentence fragments), keyword and topic features (e.g., "recipe" in the title of the page, "ingredients" heading the list of ingredients needed to prepare the soup), and formatting features (e.g., numbered lists of steps for preparing the recipe).

In some embodiments, the content may be classified as belonging to a content class, based on analysis of the content features, utilizing a machine learning model. For example, a machine learning model may classify the content as belonging to a content class based on language, or formatting, features of the displayed content. In some embodiments, the content class may be a particular set or category of content having some attributes in common. For example, the content class may be cooking recipes, instructions for a do-it-yourself project, audio books, exercise videos, etc.

In some embodiments, the device system settings may be updated based on the content class. In some embodiments, the device system settings may be updated based on the intended use of the device determined based on classification of the displayed content as belonging to the content class. For example, the device system settings may be updated to increase the amount of time before the device goes into an inactive mode during which an active screen (e.g., screen displaying content) is no longer visible (e.g., because the device screen is locked).

In some embodiments, other system setting for the device may be updated, including increasing screen brightness, activation of a voice control feature, switching to power saving modes to preserve battery life, etc. In some embodiments, there may be rules put in place about what system settings are to be changed and how they are to be changed based on classification of the displayed content as belonging to the content class. In some embodiments, these rules may be determined based, at least in part, on user input. For example, a user may be able to select how bright a screen becomes when the system settings are updated based on a content class, and subsequently the screen brightness is automatically increased when the content class is identified. In some embodiments, after navigating away from the displayed content that was classified as belonging to a content class, the device system settings automatically revert to their previous settings.

In some embodiments, the machine learning model may utilize additional device data to classify the content as belonging to the content class. The additional device data may be any data obtained from a sensor or an application on or in communication with the device that provides additional information about the device's use. That additional data may be location data (e.g., location data obtained by geofencing, Bluetooth-based, etc. indicating the location of the device), time data (e.g., indicating what time of day or what day of the week it is), accelerometer/gyroscope data (e.g., providing data which may indicate that the device was moved). For example, continuing the example of the cooking recipe content class, time data (e.g., weekday evenings) and location data (e.g., at home, in the kitchen) may additionally be useful for determining whether a user is using a device for a particular purpose (e.g., to view a recipe while cooking).

In some embodiments, the machine learning model may be trained to identify an example of the content class. In some embodiments, the training may include identifying one or more adjustment attempts. For example, the adjustment attempts may be attempts to change the device screen from a locked, sleep, or inactive state that does not display all content (or play all content if the content is video or audio content) from the active screen to an active or unlocked state in which all content is displayed or played. In some embodiments, the adjustment attempts may include changing other features such as increasing text size, increasing screen brightness, increasing volume, activation of a voice control feature, switching to power saving modes, etc. In some embodiments, the adjustment attempts may involve requiring a user to enter a passcode on a graphical user interface on the locked device screen, requiring a user to provide a fingerprint by touching a user interface on the device or device screen, facial recognition techniques, or other techniques for changing a locked screen to an unlocked and active state.

In some embodiments, the training may include determining that the adjustment attempts satisfy an adjustment criterion. In some embodiments, the training may include marking content on the screen (e.g., the active screen) of the device as the example of the content class based on determining that the adjustment attempts satisfy an adjustment criterion. In some embodiments, the adjustment criterion may relate to aspects of the adjustment attempt that can be monitored by the device using an application (e.g., an application that detects changes to system or display settings) and/or a sensor of the device (e.g., a touch sensor detecting passcode input on a touch screen of a smartphone) or on a peripheral device (e.g., an external video camera used for facial recognition that is in communication with a personal computing device).

In some embodiments, the adjustment criterion may be determined by a computing device in communication with a training system that associates adjustment attempts with content classes or may be determined by input of a user training the machine learning model, or a combination of the two. In some embodiments, the adjustment criterion may be anything that may be observed about the adjustment attempts that is associated with use of the device to display content of the particular content class. For example, the adjustment criterion may relate to the timing, frequency, effectiveness (e.g., an unsuccessful attempt at entering a passcode where 4 of the 6 digits were incorrectly entered verses an unlock attempt where 5 of the 6 digits were correctly entered, or the amount of processing time or power required to check a fingerprint used for a fingerprint based unlock feature or image used for a facial recognition based unlock feature), etc. of the adjustment attempts (e.g., an attempt to unlock the device).

In some embodiments, the training may include extracting content features from an example of the content class. In some embodiments, the content features may include textual features from textual content, formatting features from formatting content, or visual or auditory features (e.g., words spoken in a video or audio message) from visual or auditory content. In some embodiments, the training may include providing the content features as positive examples of the content class to the machine learning model.

In some embodiments, the machine learning model may be trained to classify the example of the content class by analyzing additional device data. In some embodiments, the additional device data may be any data obtained from a sensor or an application on, or in communication with, the device that provides additional information about the device's use. For example, the additional data may be location data (e.g., location data obtained by geofencing, Bluetooth-based, etc. indicating the location of the device), time data (e.g., indicating what time of day or what day of the week it is), accelerometer/gyroscope data (e.g., providing data which may indicate that the device was moved).

In some embodiments, the training may include identifying one or more additional adjustment attempts. In some embodiments, the training may include: determining that the additional adjustment attempts satisfy an adjustment criterion, marking content on the screen (e.g., the active screen) of the device as an example of the content class based on determining that the adjustment attempts satisfy the adjustment criterion, extracting content features from the example of the content class, and providing the content features as positive examples (e.g., confirmations, validations, etc.) of the content class to the machine learning model. In some embodiments, the process is repeated to classify additional content features as belonging to the content class. The content features that are classified as belonging to the content class are used to train the machine learning model to identify examples of the content class.

In some embodiments, determining that the adjustment attempts satisfy an adjustment criterion may include tracking a timing of unlock attempts during the inactive state of the device. For example, after the device screen goes to an inactive state, the time when unlock attempts are made may be tracked to determine the number and frequency of unlock attempts, and the timing of the unlock attempts from the time the device screen became inactive.

In some embodiments, determining that the adjustment attempts satisfy an adjustment criterion may include tracking a quality of unlock attempts. In some embodiments, a quality of the unlock attempt may include whether the unlock attempt was successful in unlocking the device, how much time or other resources it took to determine that the unlock attempt was successful, by how much was a threshold (e.g., a threshold to determine that the unlock attempt was successful) exceeded, etc. For example, for an unlock attempt involving use of a fingerprint to unlock the device, if the finger used to make an unlock attempt is dirty, it may take longer for the device to read the fingerprint. If the amount of time it takes the device to determine that the fingerprint is the correct fingerprint is below a threshold amount of time, the device screen is unlocked.

In some embodiments, the adjustment criterion may include a first predetermined number of unsuccessful adjustment attempts within a first predetermined time after the screen is locked. In some embodiments, the adjustment criterion may be met if the unlock attempts are sufficiently rapid. For example, if there are X number of unlock attempts within T1 time from the device screen becoming locked (or becoming inactive), then the page that the device screen was displaying prior to the device screen becoming locked may be marked as belonging to an example of content of the content class. The amount of time, T1, may be a shorter amount of time if there is higher confidence that a single user is tracked. In another example, additional device data (e.g., accelerometer and/or gyroscope data and location) may indicate that the device was moved from its location and fumbled around by a second user after the screen became locked. In that case there may be low confidence that unlock attempts from a single user are being monitored.

In some embodiments, the adjustment criterion may include a second predetermined number of unsuccessful unlock attempts within a second predetermined time after the screen is locked, where the second predetermined number of unsuccessful unlock attempts is followed by a successful unlock attempt. In some embodiments, the adjustment criterion may be met if the unlock attempts are sufficiently degraded but ultimately successful. For example, if there are Y number of unlock attempts that include Z or more attempts during a time T2 after the screen became locked, and one of the attempts, the Z+1 attempt, was successful, then the page that the device screen was on prior to the device screen becoming locked may be marked as belonging to an example of content of the content class.

In some embodiments, the machine learning model may be a binary classifier for a single specialized class of content. For example, the machine learning model may classify content from a device screen as belonging to a single content class or not belonging to the content class (e.g., the content class of "instructions for cooking"). In some embodiments, the machine learning model may utilize clustering techniques to distinguish between multiple classes. For example, the machine learning model may classify content from a device screen as belonging to one of multiple classes or not belong to any of the classes.

Furthering the example, one class may be an instruction for cooking with particular content-based features (e.g., particular language and/or formatting such as use of the word "recipe" centered on the top of the page) and/or additional features (e.g., occurring during weekend evenings, while at home in the kitchen), another class may be instructions for "do-it-yourself" projects having different content-based features (e.g., particular language and/or formatting such as use of the word "repair" centered on the top of the page) and/or additional features (e.g., occurring during weekend afternoons, while anywhere in the home), another class may be exercise videos with particular content-based features (e.g., specific language, "Yoga," in the video file title or specialized language related to Yoga postures in the audio data associated with the video) and/or additional features (e.g., occurring during weekday mornings).

In some embodiments, the rules for updating the device system settings may differ based on the classification of the content as belonging to a particular content class. For example, after classification of the content as belong to the content class of exercise videos, the device system settings may be updated to activate voice control features, while after classification of the content as belonging to the content class of "do-it-yourself" projects, the device system settings may be updated to change the amount of time before the device screen becomes locked.

Referring now to FIG. 1, a block diagram of a network 100 for adjusting device system settings in response to analysis of displayed content is illustrated. Network 100 includes a first device 102, a second device 104, a third device 112, and a system device 106. The first device 102, the second device 104, and the third device 112 are configured to be in communication with the system device 106. In some embodiments, the first device 102, the second device 104, and the system device 106 may be any devices that contain a processor configured to perform one or more of the functions or steps described in this disclosure. System device 106 includes a machine learning model 108.

In some embodiments, the system device 106 extracts content from contents displayed on a screen of the first device 102. The system device 106 analyzes features of the content. In some embodiments, the extracted content is communicated from the first device 102 to the system device 106. In some embodiments, the analyzed features of the content are communicated from the first device 102 to the system device 106. The machine learning model 108 of the system device 106 is used to classify the content as belonging to a content class based on analysis of the content features.

The first device 102 may include sensor 110, or be in communication with another sensor on another device, from which additional device data may be obtained about the current time, location of the device, or movement of the device. The additional device data is utilized by the machine learning model in addition to the content features to classify the content as belonging to a content class.

The machine learning model 108 is trained to identify examples of the content class. During the training of machine learning model 108, (one or more processors of) the system device 106 identifies one or more adjustment attempts on the second device 104. The system device 106 determines whether the adjustment attempts satisfy an adjustment criterion. The system device 106 marks the content on an active screen of the second device 104 as the example of the content class based on determining that the one or more adjustment attempts satisfy the adjustment criterion. The system device 106 extracts content features from the example of the content class. The system device 106 provides the content features as positive examples of the content class to the machine learning model 108. The system device 106 then identifies one or more additional adjustment attempts on the second device 104 and/or the third device 112. The process described through FIG. 1 is repeated to classify additional content features as belonging to the content class. The content features that are classified as belonging to the content class are used to train the machine learning model 108 to identify examples of the content class.

The second device 102 and/or third device 112 may include sensors (not illustrated), or be in communications with another sensor on another device, from which additional device data may be obtained about the current time, location of the device, or movement of the device. The additional device data may be utilized by the machine learning model 108 in addition to the content features to classify the content as belonging to a content class.

Figure 2:
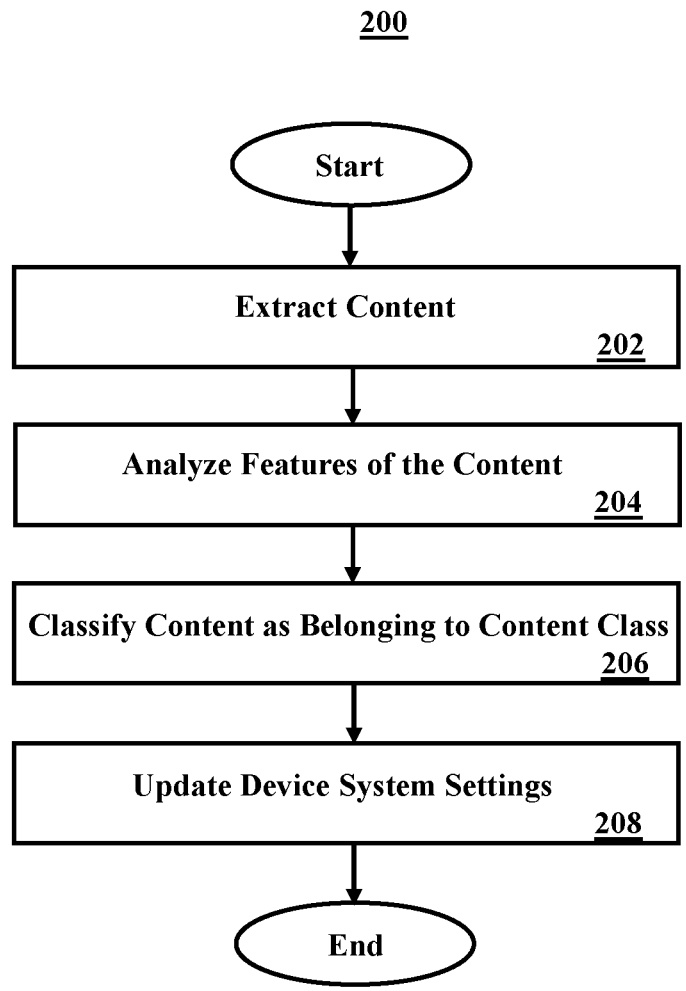
FIG. 2 is a flowchart of an exemplary method for adjusting device system settings in response to analysis of displayed content, in accordance with aspects of the present disclosure.

Referring now to FIG. 2, illustrated is a flowchart of an exemplary method 200 for adjusting device system settings in response to analysis of displayed content, in accordance with embodiments of the present disclosure. In some embodiments, a processor of a system may perform the operations of the method 200. In some embodiments, method 200 begins at operation 202. At operation 202, the processor extracts content from contents displayed on a screen of a device. In some embodiments, method 200 proceeds to operation 204, where the processor analyzes features of the content. In some embodiments, method 200 proceeds to operation 206. At operation 206, the processor classifies the content as belonging to a content class, based on analysis of the content features, utilizing a machine learning model. In some embodiments, method 200 proceeds to operation 208. At operation 208, the processor updates the device system settings based on the content class.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
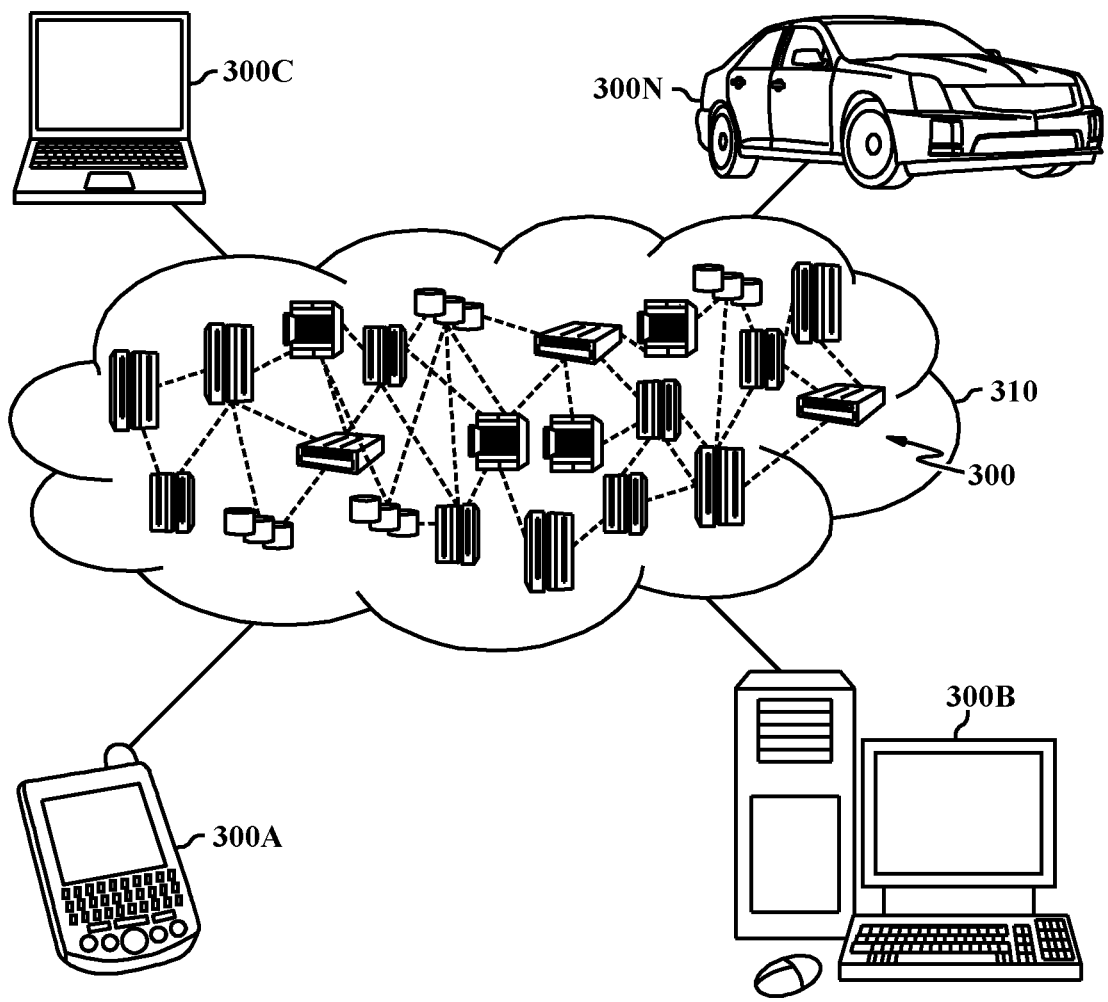
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
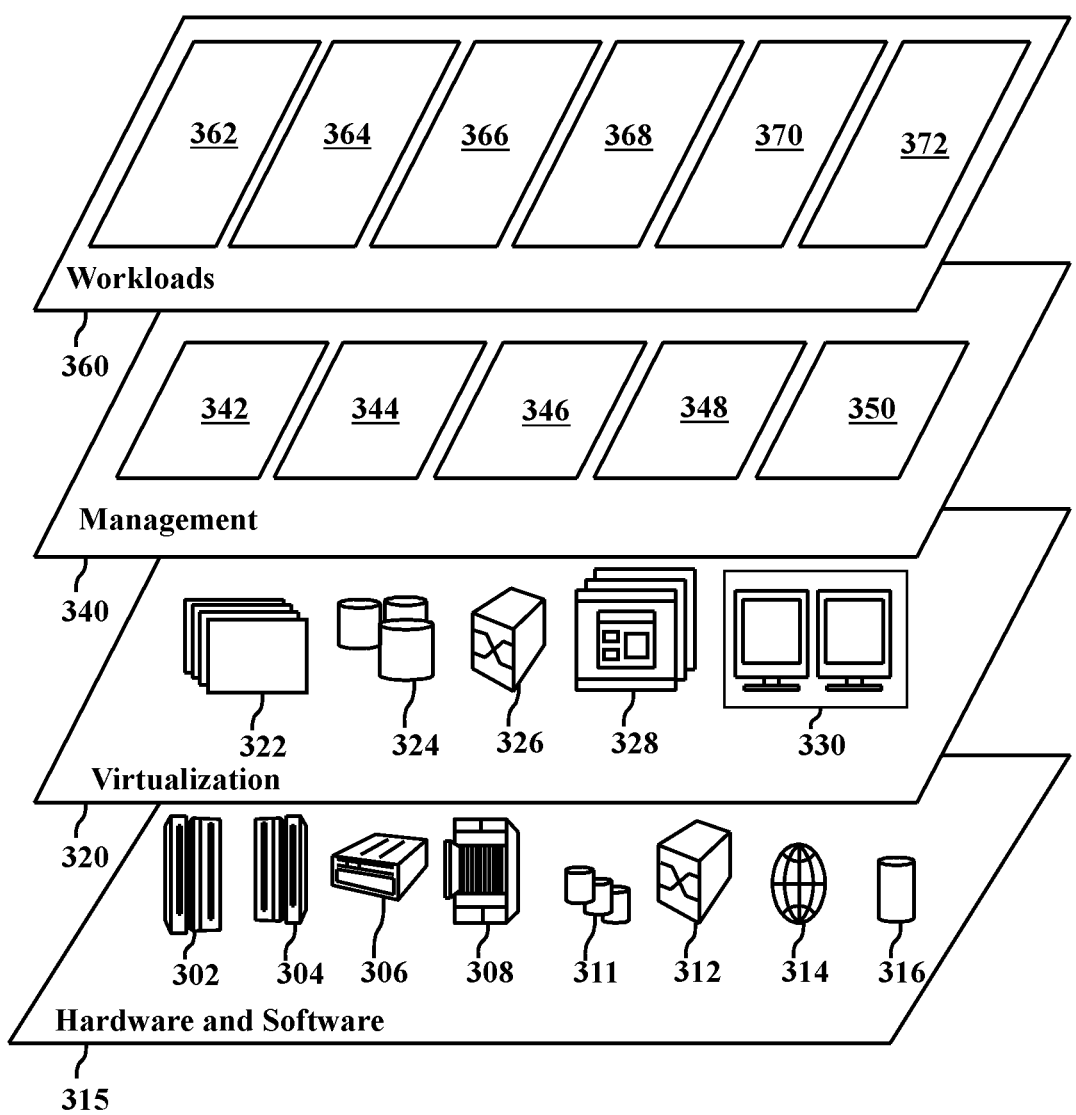
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and adjusting device system settings in response to analysis of displayed content 372.

Figure 4:
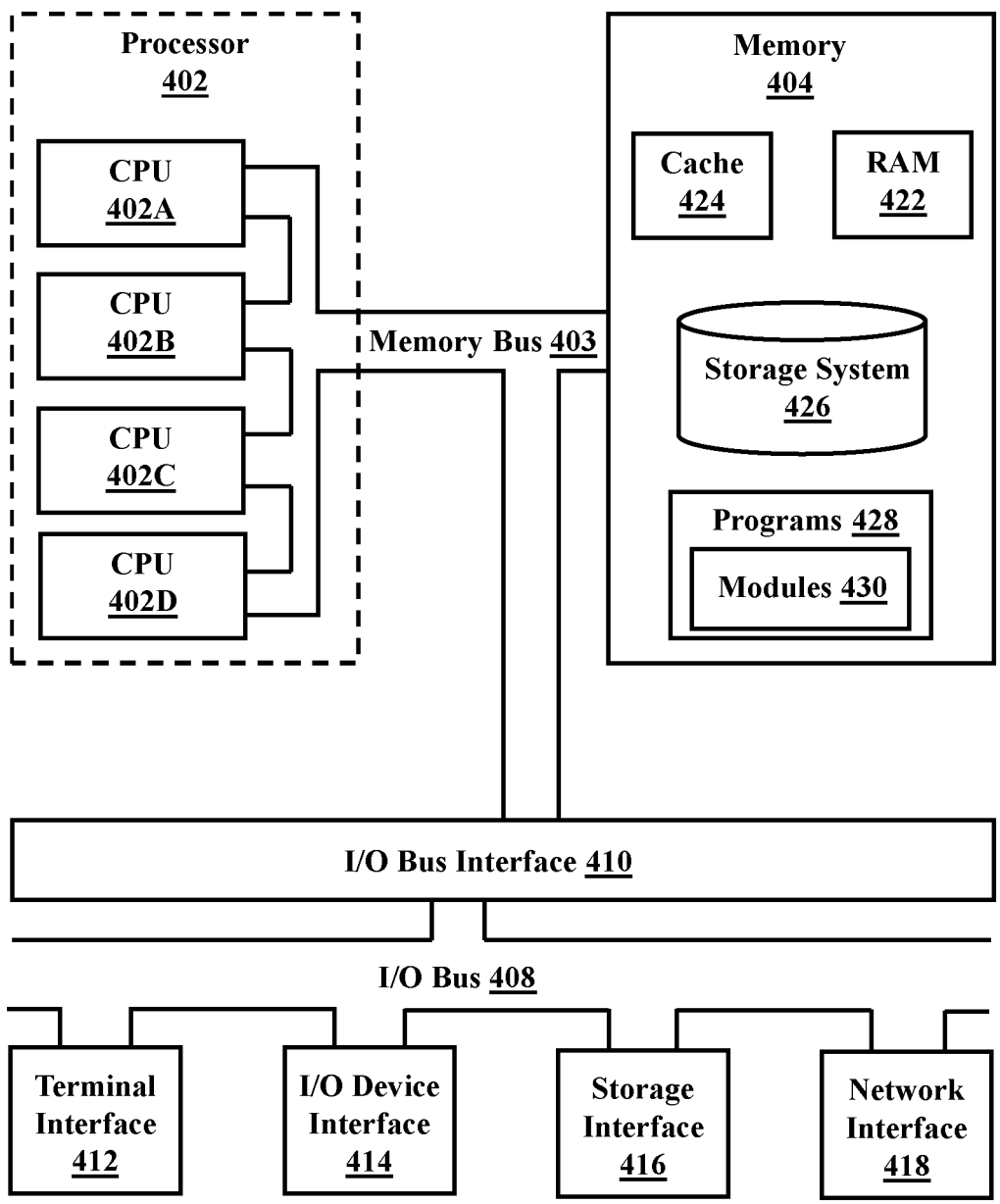
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for adjusting device system settings in response to analysis of displayed content, the method comprising:
    extracting content from contents displayed on a screen of a device;
    analyzing features of the content;
    classifying the content as belonging to a content class, based on analysis of the content features, utilizing a machine learning model, wherein the machine learning model is trained to identify an example of the content class, wherein the training includes:
    identifying one or more adjustment attempts;
    determining that the adjustment attempts satisfy an adjustment criterion, wherein determining that the adjustment attempts satisfy an adjustment criterion includes tracking a timing of unlock attempts during the inactive state of the device;
    marking content on the screen of the device as the example of the content class based on determining that the one or more adjustment attempts satisfy the adjustment criterion;
    extracting content features from the example of the content class;
    providing the content features as positive examples of the content class to the machine learning model; and
    identifying one or more additional adjustment attempts; and
    updating the device system settings based on the content class.

2. The method of claim 1, wherein classifying the content as belong to the content class further comprises analyzing additional device data utilizing the machine learning model.

3. The method of claim 1, wherein the machine learning model is trained to classify the example of the content class by analyzing additional device data.

4. The method of claim 1, wherein the adjustment criterion includes a first predetermined number of unsuccessful unlock attempts within a first predetermined time after the screen is locked.

5. The method of claim 1, wherein the adjustment criterion includes a second predetermined number of unsuccessful unlock attempts within a second predetermined time after the screen is locked, wherein the second predetermined number of unsuccessful unlock attempts is followed by a successful unlock attempt.

6. The method of claim 1, wherein the machine learning model distinguishes among two or more content classes.

7. A system comprising:
a memory; and
a processor in communication with the memory, the processor being configured to perform operations comprising:
extracting content from contents displayed on a screen of a device;
analyzing features of the content;
classifying the content as belonging to a content class, based on analysis of the content features, utilizing a machine learning model, wherein the machine learning model is trained to identify an example of the content class, wherein the training includes:
identifying one or more adjustment attempts;
determining that the adjustment attempts satisfy an adjustment criterion, wherein determining that the adjustment attempts satisfy an adjustment criterion includes tracking a timing of unlock attempts during the inactive state of the device;
marking content on the screen of the device as the example of the content class based on determining that the one or more adjustment attempts satisfy the adjustment criterion;
extracting content features from the example of the content class;
providing the content features as positive examples of the content class to the machine learning model; and
identifying one or more additional adjustment attempts; and
updating the device system settings based on the content class.

8. The system of claim 7, wherein classifying the content as belong to the content class further comprises analyzing additional device data utilizing the machine learning model.

9. The system of claim 7, wherein the machine learning model is trained to classify the example of the content class by analyzing additional device data.

10. The system of claim 7, wherein the adjustment criterion includes a first predetermined number of unsuccessful unlock attempts within a first predetermined time after the screen is locked.

11. The system of claim 7, wherein the adjustment criterion includes a second predetermined number of unsuccessful unlock attempts within a second predetermined time after the screen is locked, wherein the second predetermined number of unsuccessful unlock attempts is followed by a successful unlock attempt.

12. The system of claim 7, wherein the machine learning model distinguishes among two or more content classes.

13. A computer program product comprising a computer readable storage medium having program instructions embodied therewith, the program instructions executable by a processor to cause the processor to perform operations, the operations comprising:
extracting content from contents displayed on a screen of a device;
analyzing features of the content;
classifying the content as belonging to a content class, based on analysis of the content features, utilizing a machine learning model, wherein the machine learning model is trained to identify an example of the content class, wherein the training includes:
identifying one or more adjustment attempts;
determining that the adjustment attempts satisfy an adjustment criterion, wherein determining that the adjustment attempts satisfy an adjustment criterion includes tracking a timing of unlock attempts during the inactive state of the device;
marking content on the screen of the device as the example of the content class based on determining that the one or more adjustment attempts satisfy the adjustment criterion;
extracting content features from the example of the content class;
providing the content features as positive examples of the content class to the machine learning model; and
identifying one or more additional adjustment attempts; and
updating the device system settings based on the content class.

14. The computer program product of claim 13, wherein classifying the content as belong to the content class further comprises analyzing additional device data utilizing the machine learning model.

* * * * *